United States Patent [19]
Miller et al.

[11] Patent Number: 5,239,629
[45] Date of Patent: Aug. 24, 1993

[54] DEDICATED CENTRALIZED SIGNALING MECHANISM FOR SELECTIVELY SIGNALING DEVICES IN A MULTIPROCESSOR SYSTEM

[75] Inventors: Edward C. Miller; George A. Spix; Anthony R. Schooler, all of Eau Claire; Douglas R. Beard, Eleva; Alexander A. Silbey; Andrew E. Phelps, both of Eau Claire, all of Wis.

[73] Assignee: Supercomputer Systems Limited Partnership, Eau Claire, Wis.

[21] Appl. No.: 536,192

[22] Filed: Jun. 11, 1990

Related U.S. Application Data

[63] Continuation-in-part of Ser. No. 459,083, Dec. 29, 1989.

[51] Int. Cl.⁵ .................. G06F 13/00; G06F 15/16
[52] U.S. Cl. .................. 395/325; 364/229; 364/242.6; 364/238; 364/937.01
[58] Field of Search ... 364/200 MS File, 900 MS File; 395/200, 325, 425, 800

[56] References Cited

U.S. PATENT DOCUMENTS

| | | | |
|---|---|---|---|
| 3,510,844 | 5/1970 | Aranyi | 364/200 |
| 3,676,861 | 7/1972 | Ruth | 364/200 |
| 3,755,785 | 8/1973 | Kirk | 364/200 |
| 3,772,656 | 11/1973 | Serracchioli | 364/200 |
| 3,925,766 | 12/1975 | Bardotti | 364/200 |
| 3,996,564 | 12/1976 | Kerrigan | 364/200 |
| 4,034,346 | 7/1977 | Hostein | 364/200 |
| 4,124,889 | 11/1978 | Kaufman | 364/200 |
| 4,200,930 | 4/1980 | Rawlings | 364/200 |
| 4,264,954 | 4/1981 | Briggs | 364/200 |
| 4,328,543 | 5/1982 | Brickman | 364/200 |
| 4,418,382 | 11/1983 | Larson | 364/200 |
| 4,428,043 | 1/1984 | Gatiller | 364/200 |
| 4,484,270 | 11/1984 | Quernemoen | 364/200 |
| 4,543,630 | 9/1985 | Neches | 395/200 |
| 4,636,942 | 1/1987 | Chen et al. | 395/725 |
| 4,718,006 | 1/1988 | Nishida | 395/425 |
| 4,745,545 | 5/1988 | Schiffleger | 395/325 |
| 4,751,634 | 6/1988 | Burrus | 364/200 |
| 4,754,398 | 6/1988 | Pribnow | 395/200 |
| 4,807,116 | 2/1989 | Katzman et al. | 395/200 |
| 4,816,990 | 3/1989 | Williams | 395/650 |
| 4,845,722 | 7/1989 | Kent et al. | 370/58.2 |
| 4,891,751 | 1/1990 | Call et al. | 345/800 |
| 4,905,145 | 2/1990 | Sauber | 395/425 |
| 4,920,485 | 4/1990 | Vahidsafa | 395/725 |
| 4,937,733 | 6/1990 | Gillett, Jr. et al. | 395/325 |
| 5,016,162 | 5/1991 | Epstein et al. | 395/775 |
| 5,016,167 | 5/1991 | Nguyen et al. | 395/725 |

Primary Examiner—David Y. Eng
Attorney, Agent, or Firm—Patterson & Keough

[57] ABSTRACT

A signaling mechanism for sending and receiving signals to and from any one of all of a plurality of devices, including peripheral controllers and processors, in a multiprocessor system. The signaling mechanism includes two switches, a first switch routing a signal command generated by the device to a signal dispatch logic and a second switch for receiving signals generated by the signal dispatch logic and routing the signals to the selected device. The signal dispatch logic receiving the signal command, decodes the destination select value and generates a signal to be sent to the selected device. The signal command includes a destination select value representing a device selectably determined by the device. The signaling mechanism also includes an arbitration mechanism connected to the signal dispatch logic and the first switch for resolving simultaneous conflicting signal commands issued by two or more devices. The signal generated by the signal dispatch logic may include a plurality of bits representing one or more types of predefined signals to be acted upon by the device.

10 Claims, 14 Drawing Sheets

Fig. 5

SIGNAL DEVICE SELECTION

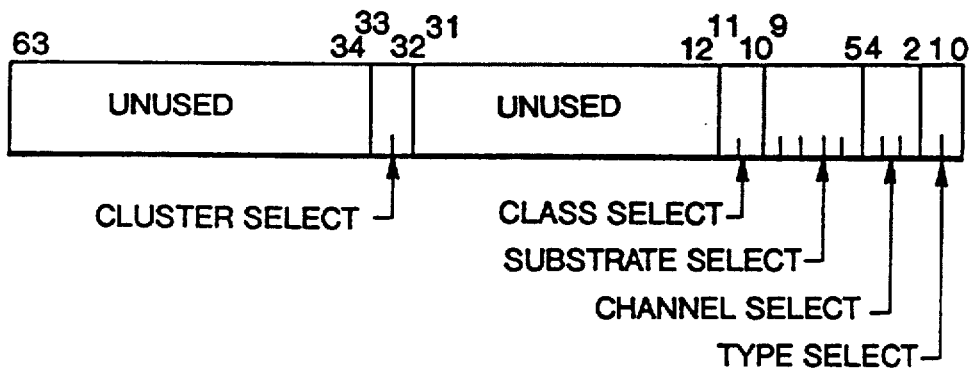

Fig. 6a

SM: SYSTEM MODE (16 BITS)
NOT USER WRITABLE.

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| DT3 | DT2 | DT1 | DT0 | DFI | | | | | DEX | | FIRM | | | | |

THIS REGISTER IS SAVED IN OSM AND THEN SET TO ALL ONES ON AN INTERRUPT, SYSTEM CALL, OR EXCEPTION. IT IS RESTORED FROM OSM BY THE RTT INSTRUCTION.

FIRM: 1=FAST INTERRUPT REQUESTS MASKED, 0=ENABLE. THIS BIT PREVENTS AN EXCEPTION (AS REPORTED IN EXCEPTION STATUS) OR A FAIR INSTRUCTION FROM CAUSING A FAST INTERRUPT REQUEST.

DEX: 1=DISABLE CONTEXT SWITCH ON ES REGISTER NON-ZERO, 0=ENABLE.

DFI: 1=DISABLE INCOMING FAST INTERRUPT, 0=ENABLE.

DT0: 1=DISABLE TYPE 0 SIGNALS, 0=ENABLE.

DT1: 1=DISABLE TYPE 1 SIGNALS, 0=ENABLE.

DT2: 1=DISABLE TYPE 2 SIGNALS, 0=ENABLE.

DT3: 1=DISABLE TYPE 3 SIGNALS, 0=ENABLE.

Fig. 6b

PI: PENDING INTERRUPTS (16 BITS)
NOT USER WRITABLE.

THIS REGISTER SHOWS THE STATUS OF INCOMING INTERRUPTS.

| 15 | 14 | 13 | 12 | 11 | 10 | 9         0 |
|----|----|----|----|----|----|-------------|
| T3 | T2 | T1 | T0 | FI |    | UNDEFINED   |

FI:  1=FAST INTERRUPT SIGNAL HAS BEEN RECEIVED, 0=NO SIGNAL

T0:  1=TYPE 0 SIGNAL HAS BEEN RECEIVED, 0=NO SIGNAL

T1:  1=TYPE 1 SIGNAL HAS BEEN RECEIVED, 0=NO SIGNAL

T2:  1=TYPE 2 SIGNAL HAS BEEN RECEIVED, 0=NO SIGNAL

T3:  1=TYPE 3 SIGNAL HAS BEEN RECEIVED, 0=NO SIGNAL

WHEN READ, THE REGISTER SHOWS WHICH INTERRUPTS ARE PENDING. READING THE REGISTER CLEARS ALL BITS TO ZERO. WHEN WRITTEN, WRITING A ZERO HAS NO EFFECT ON THE STATE OF ANY BIT. WRITING A ONE IN ANY BIT POSITION WILL SET THAT BIT TO ONE.

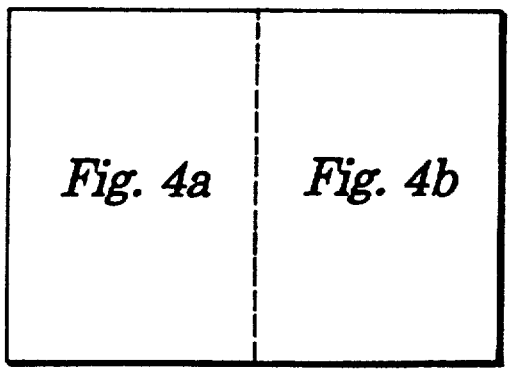

Fig. 4

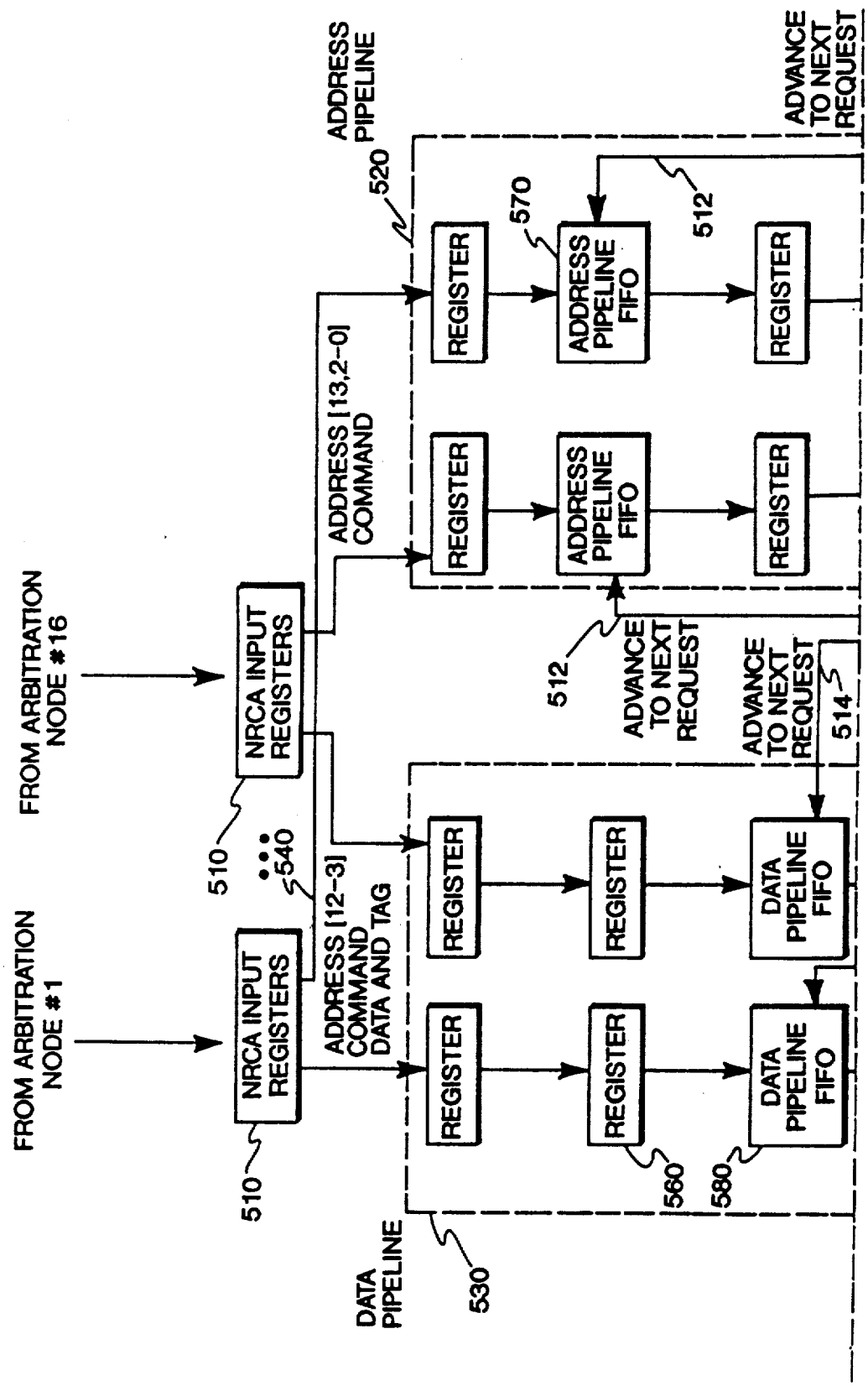

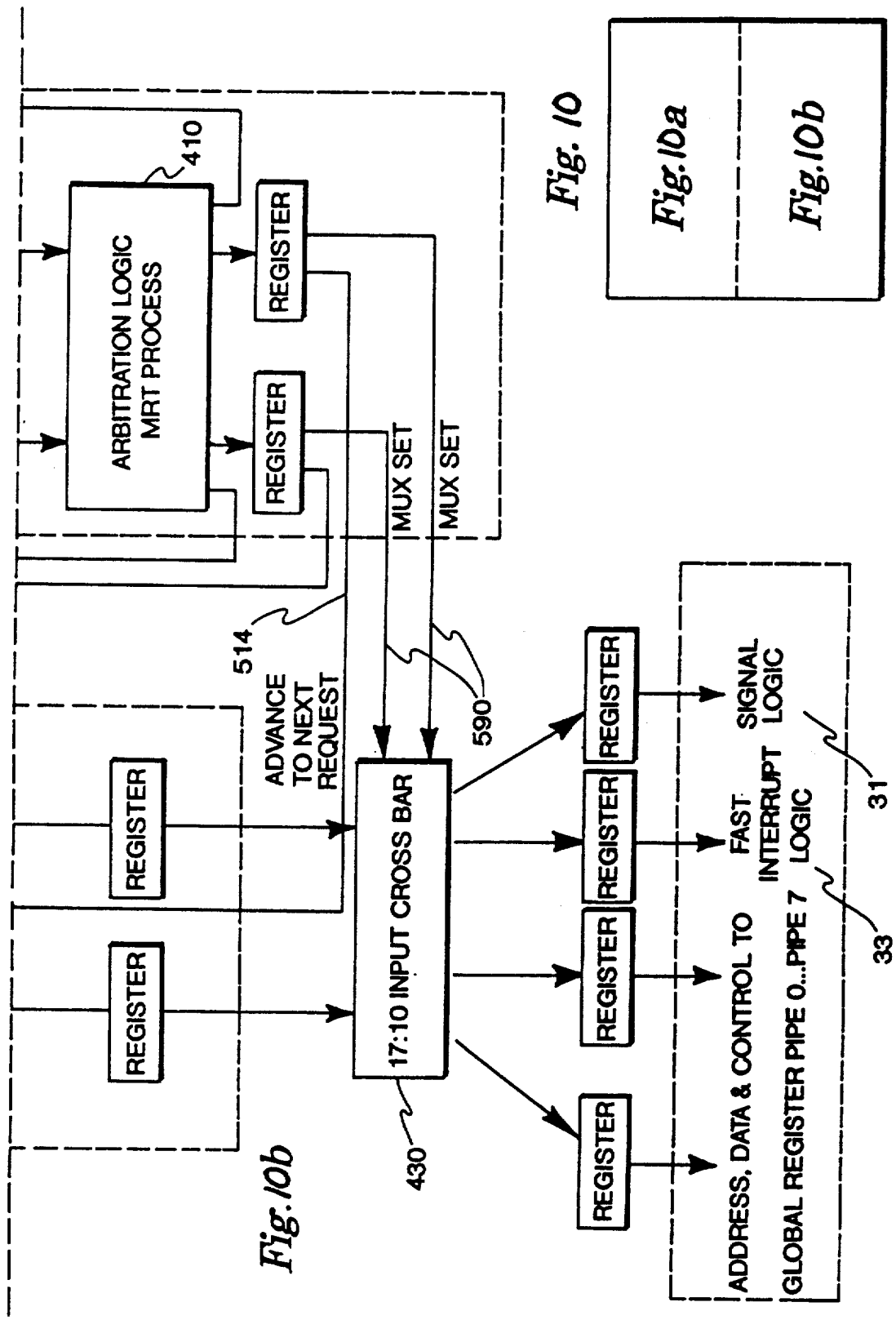

PHYSICAL ADDRESS MAP AS USED AT THE NRCA AND AT THE I/O CONCENTRATOR MEANS

DEDICATED CENTRALIZED SIGNALING MECHANISM FOR SELECTIVELY SIGNALING DEVICES IN A MULTIPROCESSOR SYSTEM

RELATED APPLICATION

This application is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, U.S. application Ser. No. 07/459,083, and assigned to the assignee of the present invention, which is hereby incorporated by reference in the present application. This application is also related to co-pending application filed in the United States Patent and Trademark Office concurrently herewith, entitled, DISTRIBUTED INPUT/OUTPUT ARCHITECTURE FOR A MULTIPROCESSOR SYSTEM, U.S. application Ser. No. 07/536,182, which is assigned to the assignee of the present invention, and a copy of which is attached and hereby incorporated in the present application.

TECHNICAL FIELD

This invention relates generally to the field of signaling and interrupt mechanisms for computer and electronic logic systems. More particularly, the present invention relates to a method and apparatus for a signaling mechanism for a multiprocessor system that allows any processor or external interface port to signal any other processor or external interface port in the multiprocessor system and can resolve simultaneous conflicting signals.

BACKGROUND ART

The parent application identified above describes a new cluster architecture for high-speed computer processing systems, referred to as supercomputers. For most supercomputer applications, the objective is to provide a computer processing system with the fastest processing speed and the greatest processing flexibility, i.e., the ability to process a large variety of traditional application programs. In an effort to increase the processing speed and flexibility of supercomputers, the cluster architecture for highly parallel multiprocessors described in the previously identified parent application provides an architecture for supercomputers wherein a multiple number of processors and external interface means can make multiple and simultaneous requests to a common set of shared hardware resources, such as main memory, secondary memory, global registers, interrupt mechanisms, or other shared resources present in the system.

One of the important considerations in designing such shared-resource, multiprocessor systems is to provide an efficient mechanism for processors and external interface ports to signal other processors and external interface ports. As used within the present invention, the term signal refers to the operation by which one device (processor or external interface port) indicates to another device that an event has occurred that requires action or intervention by the device being signaled. From a traditional software perspective, signals are more commonly referred to as interrupts in the sense that the operational flow of the device is interrupted to process the signal.

Many parallel processor architectures implement signals as messages passed through the system on a common bus or channel, such as in the Intel iPSC Concurrent computer or in the Sequent Balance Series. In this type of architecture, message transmission can take milliseconds for any processor to interrupt another in the system, largely due to the overhead associated with assembling, transmitting, and interpreting a complex message structure. This overhead is a limitation of this type of signaling architecture.

Other parallel processor architectures do not permit signals to be sent and received by peripheral controllers. In this architecture, processors are dedicated to communicating with input/output devices such that an input/output device can communicate only with the processor to which it is connected. This restriction limits the flexibility for assigning processors to input/output control tasks.

Another problem with many of the present interrupt mechanisms for multiprocessor systems is that all of the processors in the multiprocessor system are unconditionally interrupted at the completion of an input/output activity, not just the processors associated with controlling that activity. The disadvantage to this technique is that all programs executing on the multiprocessor system are interrupted which wastes processor resources while the interrupt are being serviced by one of the processors.

Although the prior art interrupt mechanisms for multiprocessor systems are acceptable under certain conditions, it would be desirable to provide a more effective interrupt mechanism for a multiprocessor system that was able to allow a process to select any individual interruptable resource to be the targeted handler for servicing a signal. In addition, it would be desirable to provide an interrupt mechanism for the cluster architecture for the multiprocessor system described in the parent application that aids in providing a fully distributed, multithreaded input/output environment.

SUMMARY OF THE INVENTION

The present invention is a signaling mechanism for a multiprocessor system that allows any processor or peripheral device to signal any other processor or peripheral device in the multiprocessor system and can resolve simultaneous conflicting signals. Unlike present interrupt mechanisms, the signaling mechanism of the present invention provides for targeted signals that include an address that is related to the signal which indicates to the hardware for the signaling mechanism where to direct the particular signal. Simultaneous conflicting signals (i.e., signals targeted to the same peripheral device or processor) are resolved by queuing the signals on a first-come, first-serve basis with an arbitration network determining the priority of simultaneous conflicting signals received during the same clock cycle. The simultaneous conflicting signals are then processed serially based upon the assigned priority.

The present invention requires a very simple code to select a destination to receive a signal and provides a dedicated hardware network for signal distribution that rapidly transmits signals throughout the system. The present invention permits any processor in the system to signal any input/output device, as well as the reverse.

Although it is theoretically possible for all of the devices in a multiprocessor system provided with the present invention to simultaneously issue conflicting signals, the present invention takes advantage of the statistical improbability of this occurrence to optimize the amount of hardware required to process the conflicting signals as compared to the decrease in the overall performance of the multiprocessor system as a result of serially processing such conflicting signals.

The signaling mechanism is accessible throughout the multiprocessor system. All processors and peripheral devices (i.e., secondary memory transfer controllers and peripheral controllers) are able to send and receive signals. In addition, all signals carry two bits of information that are used by the receiving device to determine what action, if any, should be taken as a result of receiving the signal. These features permit the implementation of a variety of signaling techniques throughout the system. For example, a secondary memory transfer controller uses type 0 signals as a start command, and uses type 1 signals as a halt command. Because any processor or peripheral device in the system can send a signal to any secondary memory transfer controller, any device can start or stop any secondary memory transfer controller in the system.

An objective of the present invention is to provide a method and apparatus for a signaling mechanism for a multiprocessor system that allows any processor or external interface port to signal any other processor or external interface port in the multiprocessor system.

Another objective of the present invention is to provide a signaling mechanism that can resolve simultaneous conflicting signals issued by a plurality of processors or external interface ports.

Another objective of the present invention is to provide a signaling mechanism that conveys a plurality of types of signal to the receiving device.

These and other objectives of the present invention will become apparent with reference to the drawings, the detailed description of the preferred embodiment and the appended claims.

DESCRIPTION OF THE DRAWINGS

FIGS. 4, 4a and 4b are collectively an overall block diagram of the input/output architecture of the present invention.

FIG. 5 is a schematic representation showing the signal device selection implementation.

FIG. 6a is a diagram of the System Mode register.

FIG. 6b is a diagram of the Pending Interrupts register.

FIGS. 10a and 10b are collectively a more detailed block diagram of FIG. 9 showing the data and address pipelines for the global registers.

DESCRIPTION OF THE PREFERRED EMBODIMENTS

Figure 1:
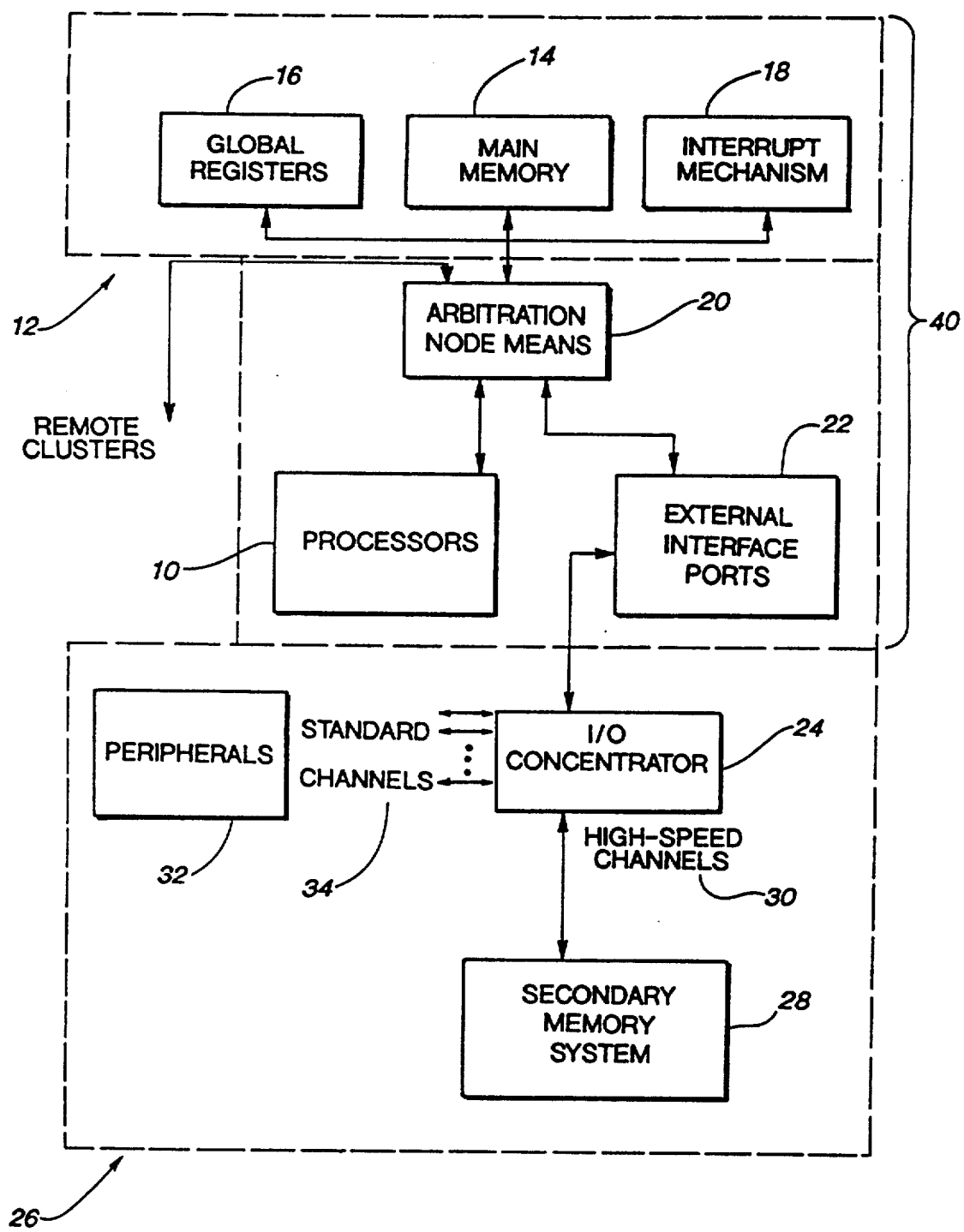
FIG. 1 is a block diagram of a single multiprocessor cluster of the preferred embodiment of the present invention.

Referring to FIG. 1, the architecture of a single multiprocessor cluster of the preferred embodiment of the multiprocessor system for use with the present invention will be described. The preferred cluster architecture for a highly parallel scalar/vector multiprocessor system is capable of supporting a plurality of high-speed processors 10 sharing a large set of shared resources 12 (e.g., main memory 14, global registers 16, and interrupt mechanisms 18). The processors 10 are capable of both vector and scalar parallel processing and are connected to the shared resources 12 through an arbitration node means 20. Also connected through the arbitration node means 20 are a plurality of external interface ports 22 and input/output concentrators (IOC) 24 which are further connected to a variety of external data sources 26. The external data sources 26 may include a secondary memory system (SMS) 28 linked to the input/output concentrator 24 via a high speed channel 30. The external data sources 26 may also include a variety of other peripheral devices and interfaces 32 linked to the input/output concentrator 24 via one or more standard channels 34. The peripheral devices and interfaces 32 may include disk storage systems, tape storage system, printers, external processors, and communication networks. Together, the processors 10, shared resources 12, arbitration node 20 and external interface ports 22 comprise a single multiprocessor cluster 40 for a highly parallel multiprocessor system in accordance with the preferred embodiment of the present invention.

Figure 2A:
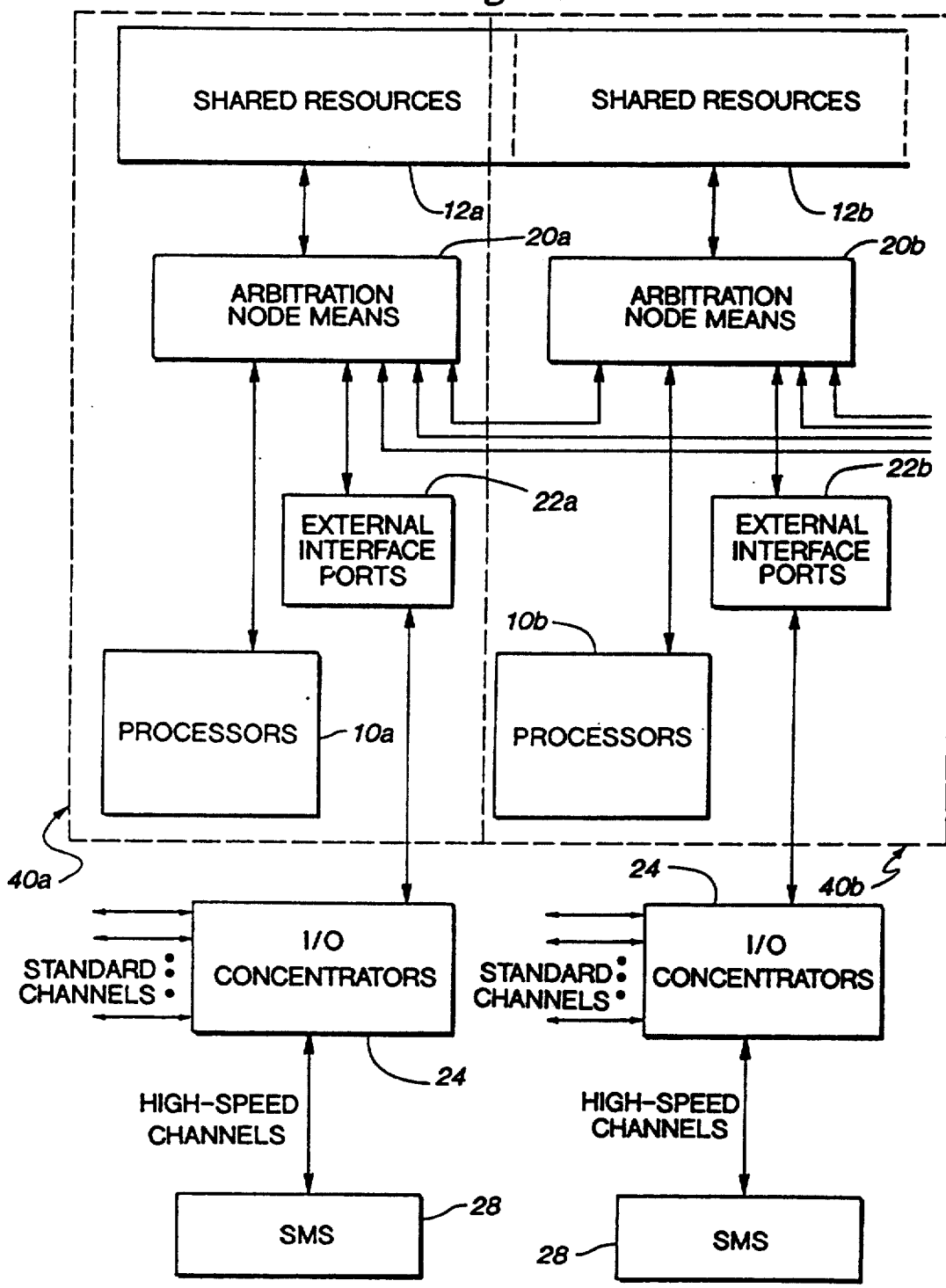
FIGS. 2a and 2b are collectively a block diagram of a four cluster implementation of the preferred embodiment of the present invention.
Figure 2B:
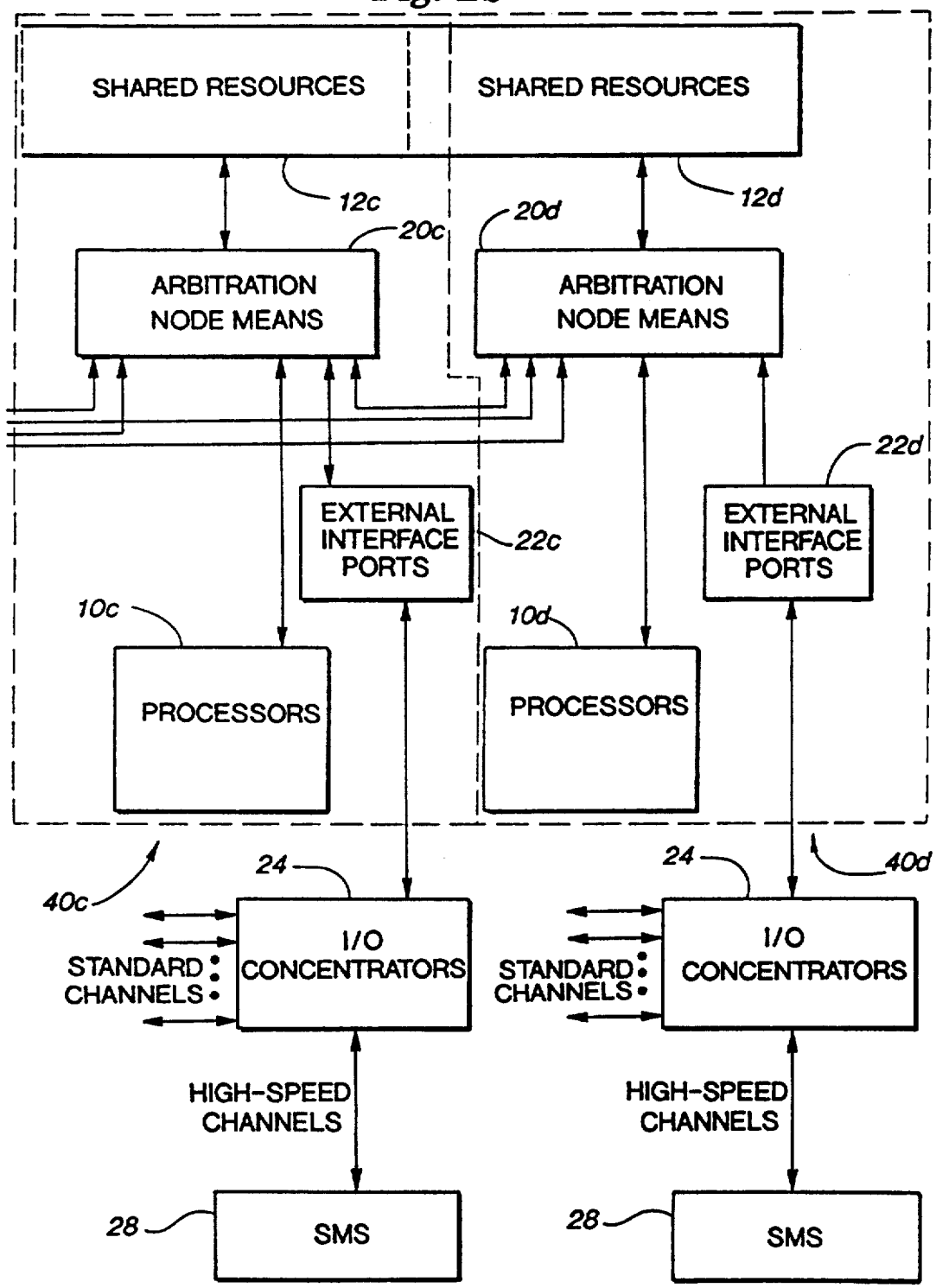

The preferred embodiment of the multiprocessor clusters 40 overcomes the direct-connection interface problems of present shared-memory supercomputers by physically organizing the processors 10, shared resources 12, arbitration node 20 and external interface ports 22 into one or more clusters 40. In the preferred embodiment shown in FIG. 2a and 2b, there are four clusters: 40a, 40b, 40c and 40d. Each of the clusters 40a, 40b, 40c and 40d physically has its own set of processors 10a, 10b, 10c and 10d, shared resources 12a, 12b, 12c and 12d, and external interface ports 22a, 22b, 22c and 22d that are associated with that cluster. The clusters 40a, 40b, 40c and 40d are interconnected through a remote cluster adapter 42 that is a logical part of each arbitration nodes means 20a, 20b, 20c and 20d. Although the clusters 40a, 40b, 40c and 40d are physically separated, the logical organization of the clusters and the physical interconnection through the remote cluster adapter 42 enables the desired symmetrical access to all of the shared resources 12a, 12b, 12c and 12d across all of the clusters 40a, 40b, 40c and 40d.

Figure 3:
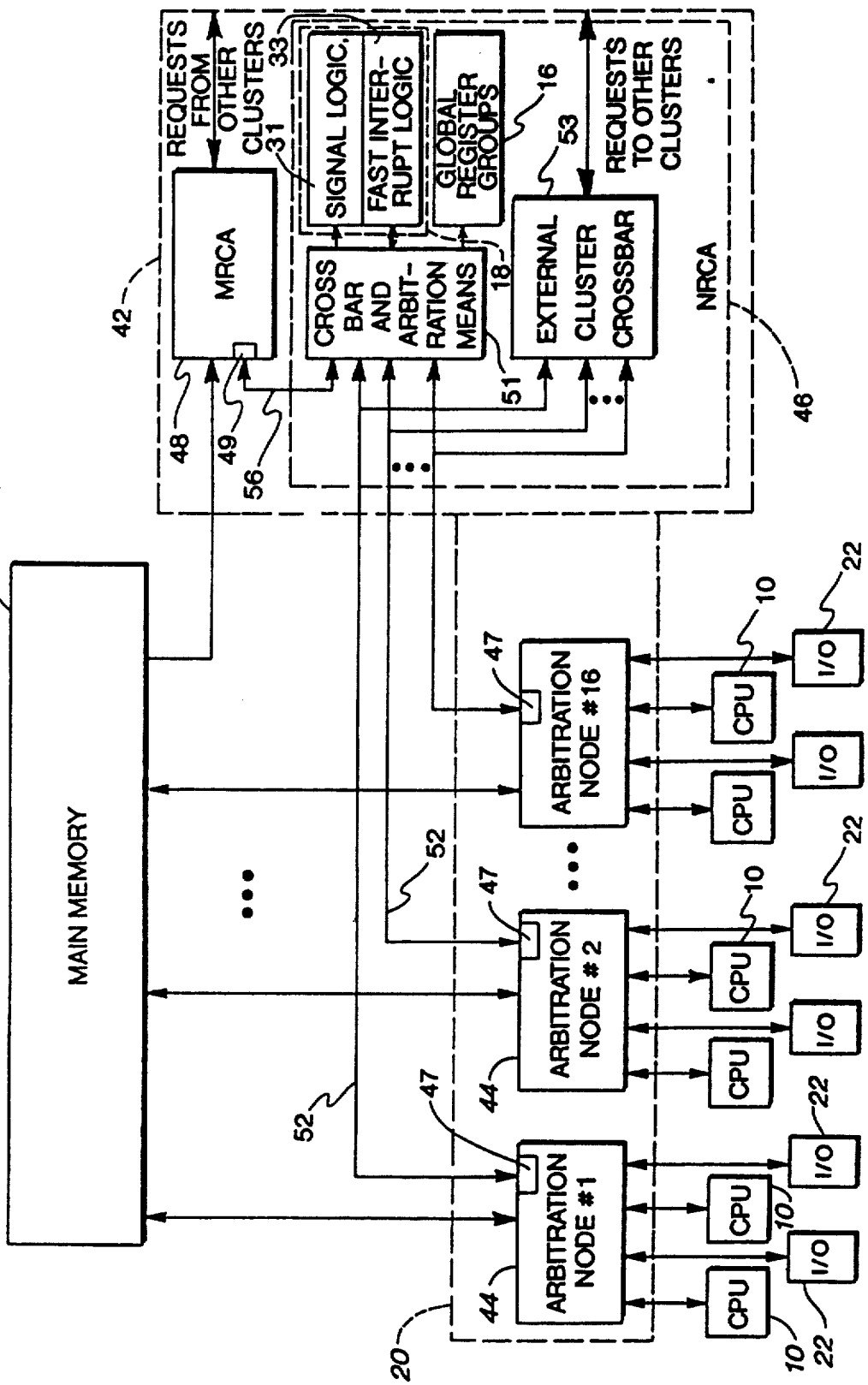
FIG. 3 is a block diagram of showing the implementation of the Fast Interrupt mechanism as part of the NRCA means of the preferred embodiment of the multiprocessor system.

Referring now to FIG. 3, the physical organization of the Signaling Mechanism in the four-cluster preferred embodiment of the present invention will be described. There are sixteen ports 47 to the global registers 16, signal logic 31, and fast interrupt logic 33 from the thirty-two processors 10 and thirty-two external interface ports 22 in a cluster 40. Each port 47 is shared by two processors 10 and two external interface ports 22 and is accessed over the path 52. A similar port 49 services inter-cluster requests for the global registers 16, fast interrupt logic 31, and signal logic 33 in this cluster as received by the MRCA means 48 and accessed over the path 56. As each request is received at the NRCA means 46, a cross bar and arbitration means 51 direct requests to the appropriate destination. If simultaneous requests come in for access to the SETN registers in the fast interrupt logic 33, for example, these requests are arbitrated for in a pipelined manner by the cross bar and arbitration means 51. The cross bar and arbitration means 51 utilizes a Multiple Request Toggling scheme algorithm. It receives input from sixteen arbitration nodes 44 and one MRCA means 48. An arbitration decision requires address information to select the target register and control information to determine the operation to be performed. This information is transmitted to the NRCA means 46 along with the data. The address and control can be for data to be sent to global registers 16 or to signal logic 31 or the fast interrupt logic 33.

Figure 9:
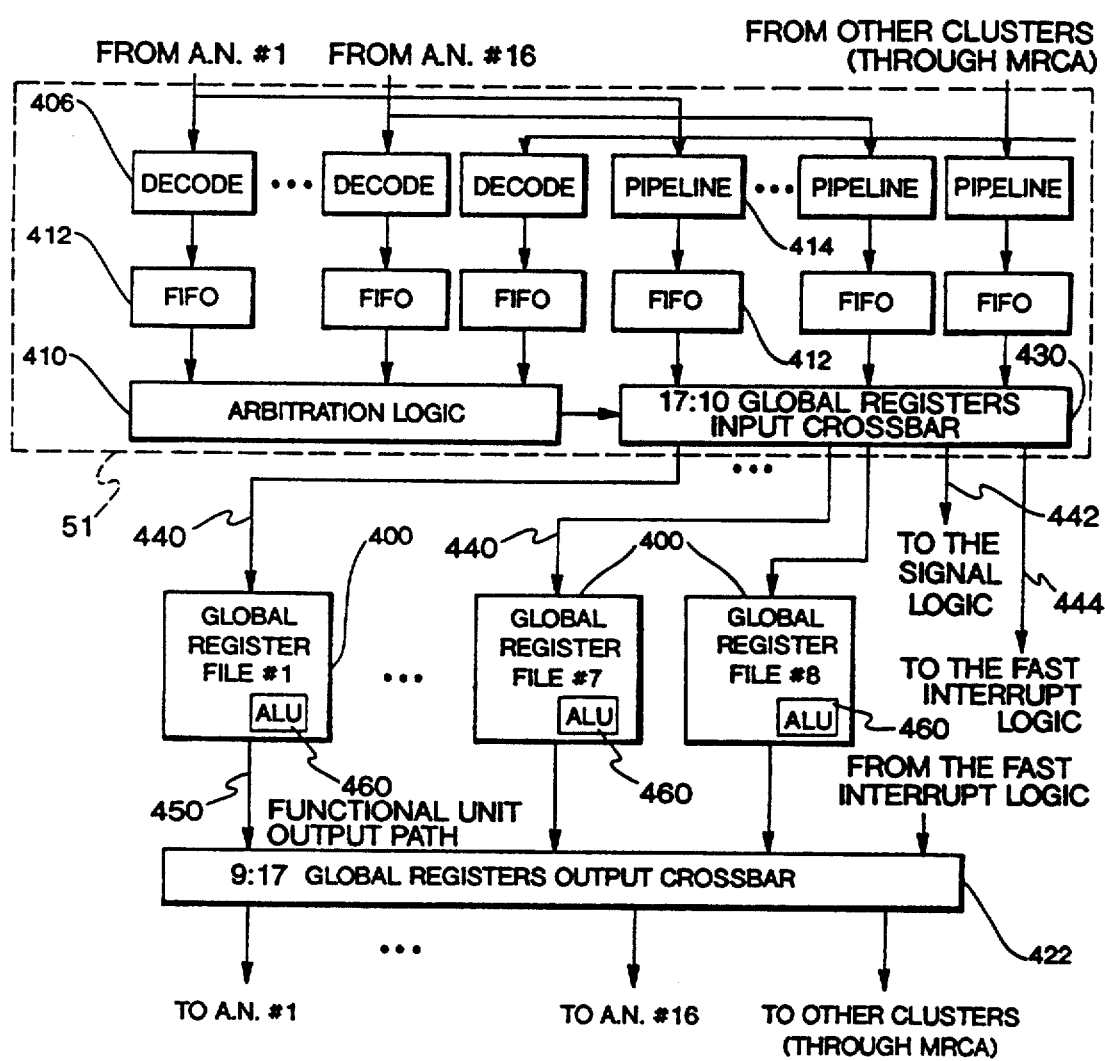
FIG. 9 is a block diagram showing the arbitration logic and cross bar switch mechanisms for the various global register files and signal mechanism of the present invention.

Referring now to FIG. 9, the cross bar/arbitration means 51 is described in greater detail. The flow begins with data from one of the arbitration nodes 44 which has been buffered by the NRCA means 46. As each request is received at the NRCA input registers 510 (FIG. 10), decode logic 406 decodes the request to be presented to a global register arbitration network 410. If simultaneous requests come in for multiple global registers 16 in the same global register file 400, these requests are handled in a pipelined manner by the FIFO's 412, pipelines 414 and the global register arbitration network 410. Priority is assigned by a FIFO (first in, first out) scheme supplemented with a multiple request toggling priority scheme. The global register arbitration network 410 uses this type of arbitration logic, or its equivalent, to prioritize simultaneous requests to the same global register file 400. When priority is determined by the arbitration network 410, a 17×10 crossbar switch means 430 matches the request in the FIFO 412 with the appropriate global register file 400. A plurality of NRCA input registers 510 (FIG. 10) provide seventeen paths into the global registers input crossbar 430. There are eight paths 440 out of the global registers input crossbar 430 to the global register files 400, one path 442 to the signal logic 31, and one path 444 to the fast interrupt logic 33. After the global register file operation is completed, global register output cross bar 422 routes any output from the operation back to the requesting port.

In the preferred embodiment shown in FIG. 10, each global register file 400 has 1024 general purpose, 64-bit registers. Each global register file 400 also contains a separate Arithmetic and Logical Unit (ALU) operation unit 460, permitting eight separate global register operations in a single clock cycle per cluster. The global register files 400 are interleaved eight ways such that referencing consecutive locations accesses a different file with each reference. In this embodiment, the global registers are implemented using a very fast 1024×64-bit RAM.

As shown in FIG. 10, address and command information travel through a pipeline 520 that is separate from the data pipeline 530. The address and command information is decoded and used to direct data and certain of the address bits to their destination. Because the results of the arbitration decisions are used to direct data to this destination, the data and arbitration results must arrive at the input crossbar 430 in the same clock cycle. Staging registers 560 are added to the data pipeline 530 to adjust the data delay to match the control delay through the address pipeline 520.

Figure 11:
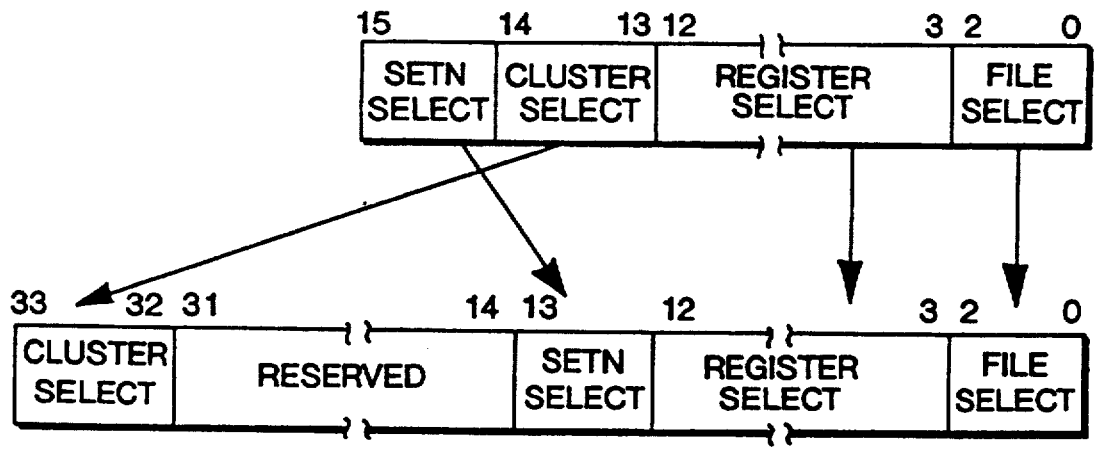
FIG. 11 is a schematic representation of the logical and physical address maps for the global registers.

As shown in FIG. 11, the arbitration is based on a decode of address bit 13 (the SETN select bit), the three address least significant bit (the global register file select bits), and a four-bit operation code (not shown). If the operation code specifies a signal operation, the address and data information are always sent to the signal logic output port 442. If address bit 13 is set to one, the address, data, and command information are sent to the fast interrupt logic output port 444. Otherwise, the address, control, and data are sent to the global register file output port selected by the three address LSB using one of the paths 440.

The other ten address bits of the logical address (bits 12-3) shown at path 540 in FIG. 10 are not used in the arbitration process. They accompany the data and are used in the functional units to select which register in the file 400 will be modified. The command bits on path 540 are duplicated and carried through the data pipeline as well for use at the destination.

Simultaneous requests from different sources for the same global register file 400 (or for the signal logic 31 or the fast interrupt logic 33) are resolved by the arbitration logic 410 by granting one of the requestors access and delaying any other requests to later cycles. The arbitration address pipeline registers 520 hold any requests that cannot be immediately serviced in the Address Pipeline FIFO 570. In any single Data Pipeline FIFO 580, the data are submitted serially. Similarly, requests in the Address Pipeline FIFO 570 are handled serially. For example, data B entered later cannot pass data A entered before it. Although data A may be waiting for a busy global register, and data B may be waiting for an available global register, data B can not be processed until data A is finished. Data stays in order within a single queue; no data under Address Control can slip ahead of the data order in Data Address Control.

Ten arbitrations can be handled simultaneously by the arbitration logic 410. If data cannot go, signals 512 and 514 are sent to FIFOs 570 and 580, respectively, instructing them to hold the request at their respective outputs. The FIFOs 570 and 580 then wait for their arbitration decision. Signals (not shown) are sent back to each requestor from the arbitration logic 410 indicating that a request has been removed from the FIFOs 570 and 580. The source uses this signal to determine when the FIFOs 570 and 580 are full. The source stops sending requests when the FIFOs 570 and 580 are full so that no requests are lost. Once an arbitration decision is made, a multiplex select signal 590 is generated that steers the input cross bar 460. This automatically unloads the FIFOs 570 and 580 and sends data to the global register files 400 or the signal logic 31 or the fast interrupt logic 33.

Figure 4A:
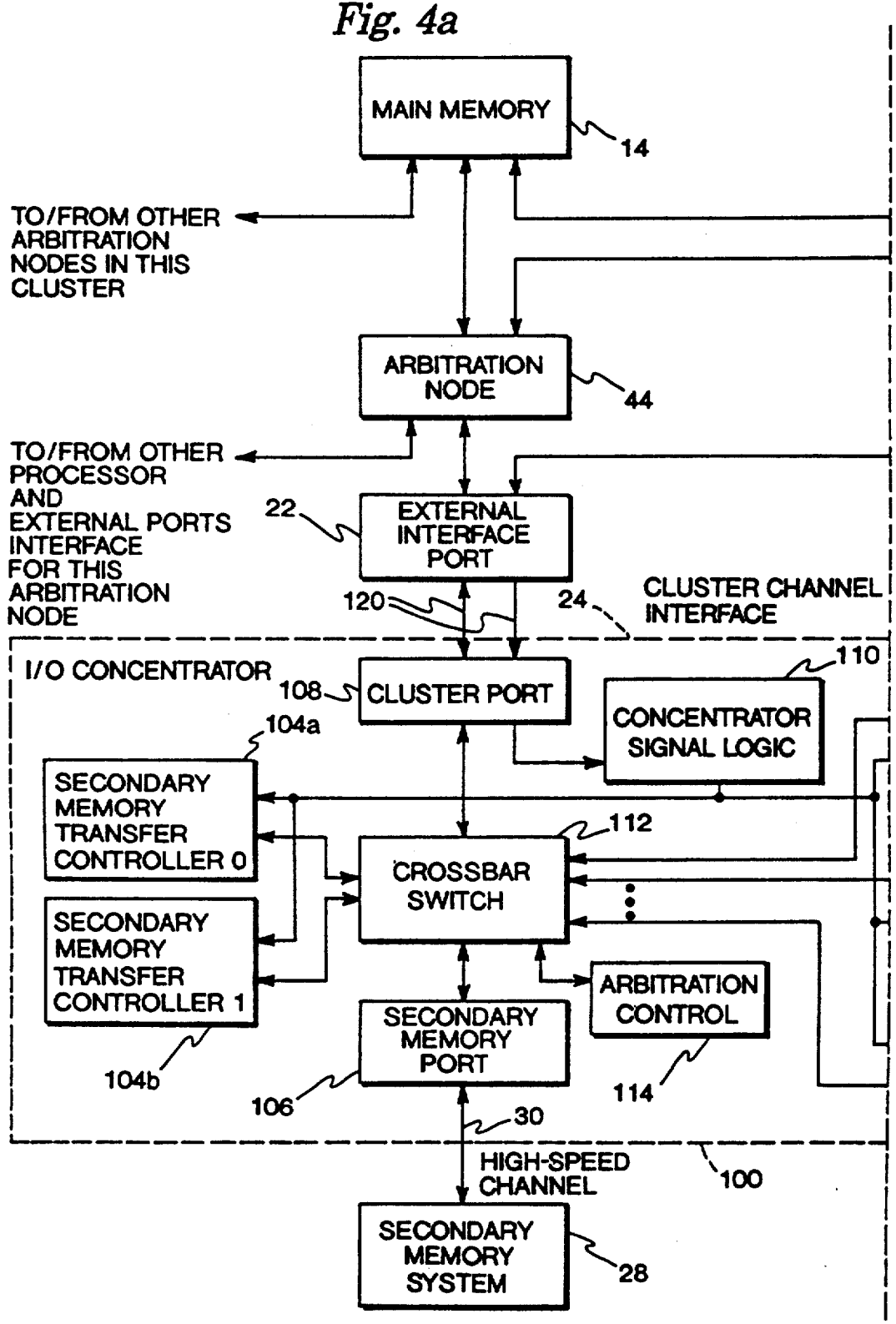
Figure 4B:
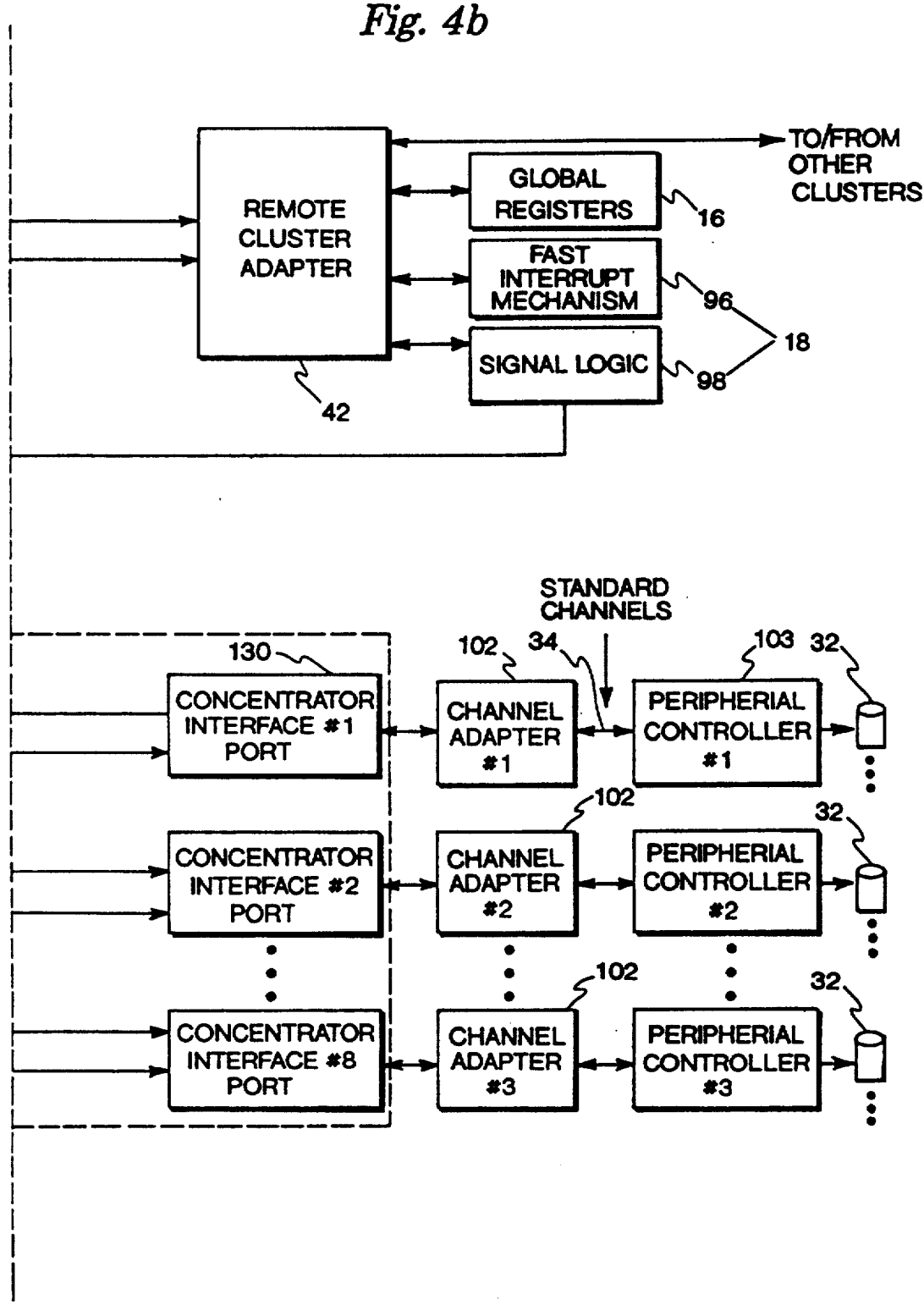

Referring now to FIG. 4, an overview of the architecture for the input/output system of the preferred embodiment of present invention will be described. The input/output peripheral devices 32 are connected through the standard channels 34, the input/output concentrator 24 and the external interface ports 22 to the main memory (MM) 14 and global registers 16 and can directly read and write to these shared resources 12 within the same cluster 40, as well as in other clusters 40. The peripheral devices 32 can also read and write to secondary memory (SM) in the secondary memory system (SMS) 28 associated with the same cluster 40a, for example, but cannot access the SMS 28 in other clusters 40b-40d. It should be noted that a path is not available to allow processors 10 and peripheral devices 32 to directly exchange data. Any such exchanges must take place through main memory 14, SMS 28 or the global registers 16.

The input/output concentrator (IOC) 24 contains the data paths, switches, and control functions to support data transfers amoung the various input/output components. In the preferred embodiment, either eight or sixteen IOC's 24 are physically located within a single input/output chassis 100. Each IOC 24 supports up to eight channel adapters 102 that interface to the standard channels 34 and the peripheral controllers 103, a secondary memory transfer controller (SMTC) 104 that controls a secondary memory port 106 to the high speed channel 30 and the SMS 28, a cluster port 108 that connects to the external interface ports 22, concentrator signal logic 110 that distributes interrupt signals to the channel adapters 102 and the SMTC 104, and a data path crossbar switch 112. Each IOC 24 can read or write a single, 64-bit word in main memory 14 every other clock cycle. The IOC 24 can also read or write a word to the SMS 28 while simultaneously accessing main memory 14.

Each channel adapter 102 contains the functions necessary to exchange data with a peripheral device controller 103 from an input/output peripheral device 32 over a standard input/output channel 34. The channel adapters 102 access main memory 14, SMS 28 and global registers 16, and send signals to the processors 10 through the IOC 24. The cross bar switch 112 in the IOC 24 multiplexes access requests among the channel adapters 102 attached to it, routing data to the destination selected by a given transfer. All eight channel adapters 102 requesting data at the maximum rate require the maximum available rate from main memory 14 or the maximum available rate from SMS 28.

The peripheral controllers 103 through the standard channel 34 can initiate signals by writing the destination select value to the signal interrupt logic 31. A command code is supported by the standard channel 34 that allows a peripheral controller 103 to perform this operation. The SMTC 104 may also transmit signals to peripheral device controllers 103. Logic in the input/output system initiates the appropriate channel activity when it detects that a signal has been sent to the device associated with any given channel. This method is used to initiate signals and the action taken in response to a signal varies according to device type. The input/output logic, the command codes and other details of the operation of signals in the input/output subsystem of the preferred embodiment are described in greater detail in the in the previously identified co-pending application entitled DISTRIBUTED INPUT/OUTPUT ARCHITECTURE FOR A MULTI-PROCESSOR SYSTEM.

A destination for the signals is selected by transmitting a destination select value along with the signal. FIG. 5 shows the logical-to-physical mapping for the destination select values. Both processors 10 and IOCs 24 can send and receive signals, in the same and in different clusters 40. The following describes how the contents of the Signal Value are interpreted in the system:

Cluster Select determines which cluster 40 the Signal will be sent to. Logic in the NRCA means 46 and MRCA means 48 determines which cluster is signalled for any value.

Substrate Select determines the physical processor 10 or input/output concentrator 24 which will receive the signal.

Class Select determines which type of device will receive the interrupt. The two bit code is as follows: 0—processor, 1—input/output concentrator, 2—secondary memory transfer controller, and 3—reserved.

Channel Select. When an input/output concentrator 24 is specified in the Class Select field, bits 4 through 2 address a channel adapter on the IOC 24 selected in the Substrate Select field. When the secondary memory transfer controller is specified in the Class Select field, bit 2 selects which secondary memory transfer controller in an input/output concentrator means 26 will be interrupted: 0—The Main Memory to Secondary Memory Transfer Controller is signalled, 1—the Secondary Memory to Main Memory Transfer Controller will be signalled. This field is ignored for all other class selections.

Type Select determines which type of signal is to be transmitted. The signal type is captured at the destination device. The effect of different types of signals is device dependent.

Processors 10 generate Signals through the Signal instruction. For signals generated by the Signal instruction, the value in the S register selected by the Signal instruction is interpreted as the destination select value. Signals are received by the processors 10 as interrupt requests. Referring to FIGS. 6a and 6b, the signal are masked by the Disable Type bits (DT0-3) in the System Mode register. Masks for the Interval Timer and Fast Interrupt request as described in the previously identified parent application are also located in the System Mode register. Pending interrupts are captured in the Pending Interrupt (PI) control register. A bit in the PI register corresponds to each type of interrupt. An incoming signal sets the appropriate PI register bit and causes an interrupt if the SM mask for that bit is not set. PI bits are cleared by the interrupt handler code after recognizing the interrupts.

Figure 7:
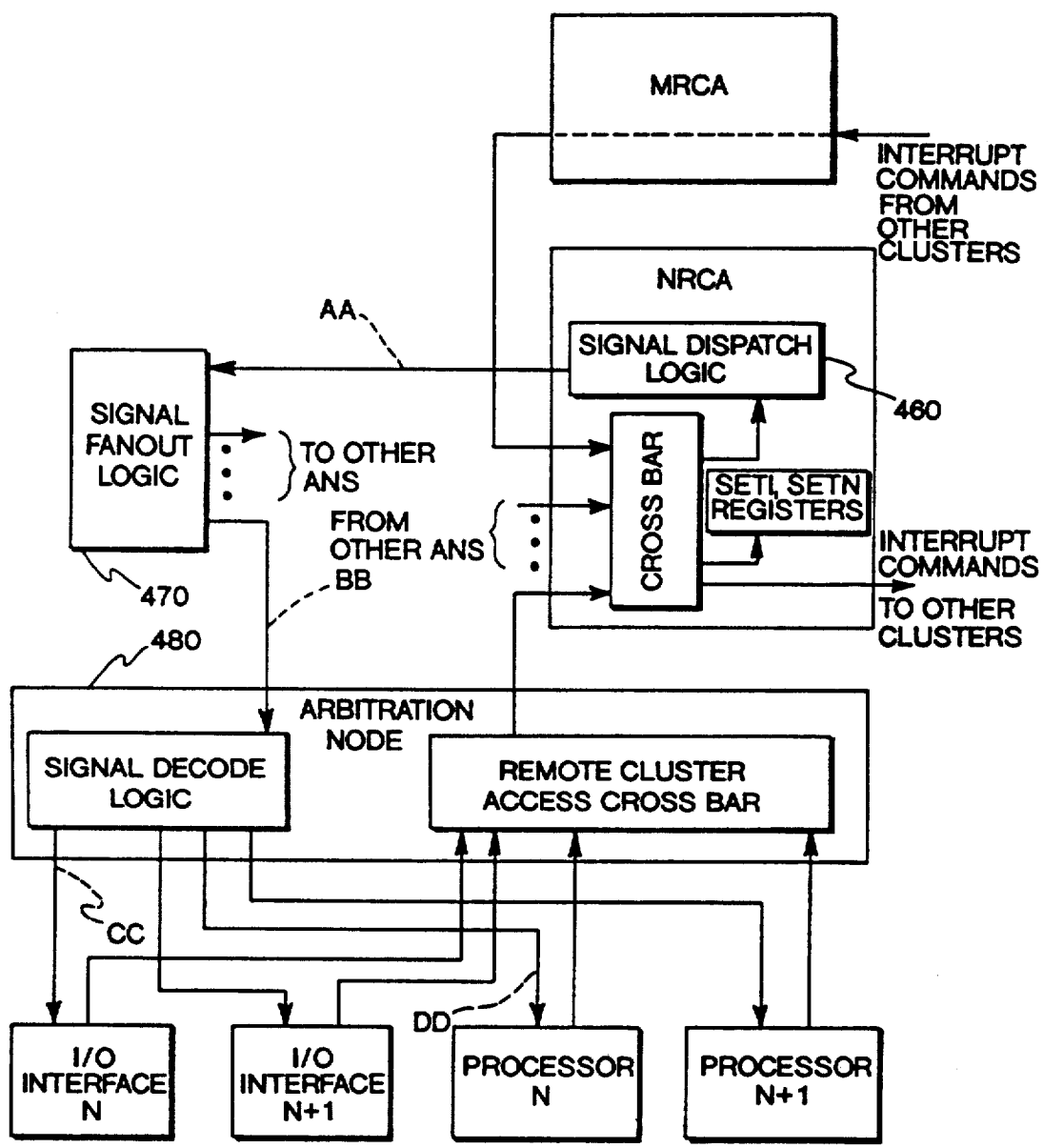
FIG. 7 is an overall block diagram of showing the operation of signals in accordance with the present invention.
Figure 8:
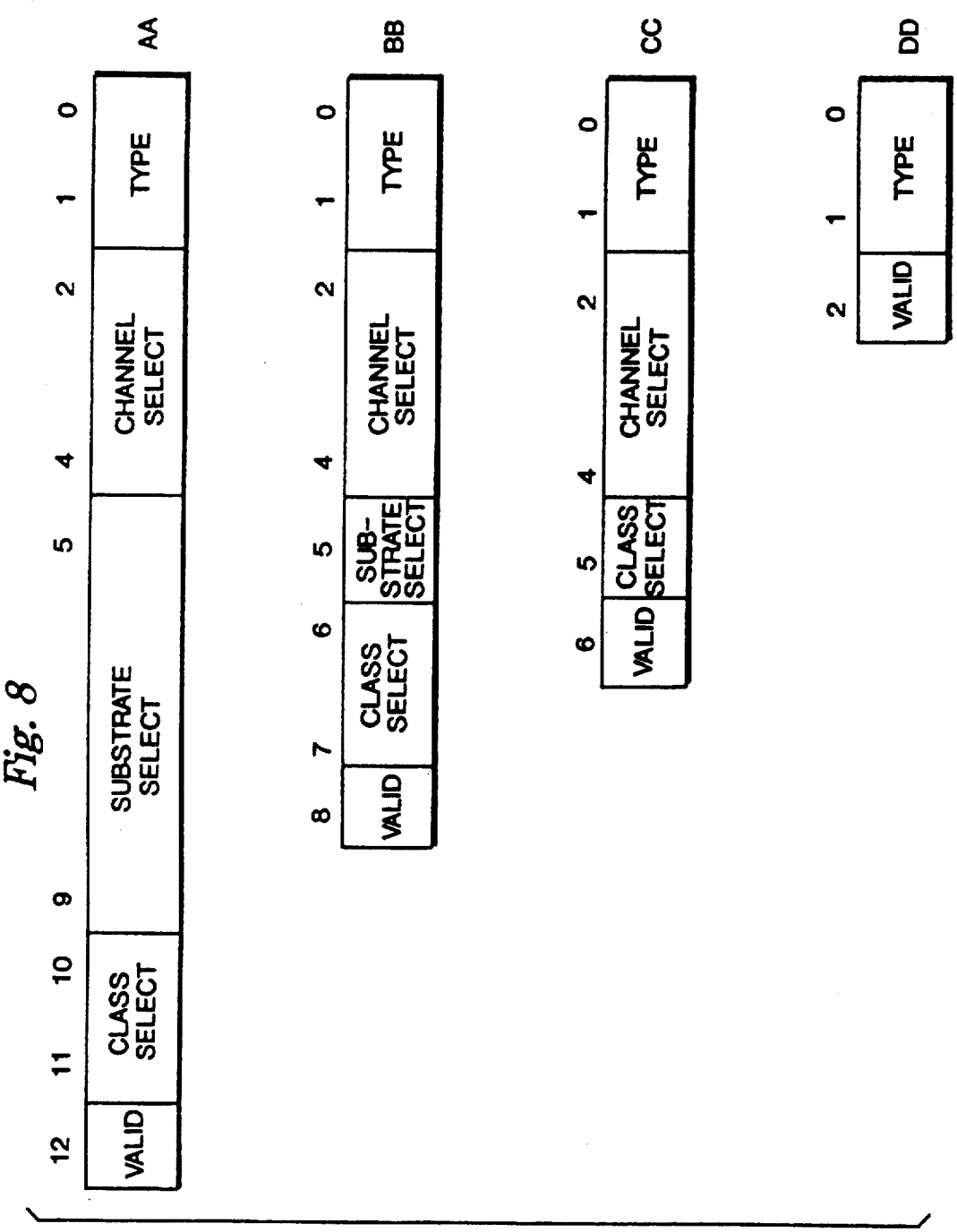
FIG. 8 shows the condition of the various signals indicated in FIG. 7 at each point in the operational flow of the signaling mechanism.

Referring now to FIG. 7, a logical block diagram shows the operation of signals (interrupts) within the present invention. Processors 10 may initiate signals by executing the Signal instruction. The Signal instruction causes the contents of the referenced S-register to be sent to the NRCA means 46 through the arbitration node 44. Similarly, peripheral devices (i.e., peripheral controllers 103 and SMTCs 104) initiate signals by sending a command and signal value to NRCA means 46 through the port 47 in the arbitration node 44. The NRCA means 46 examines the cluster select bits in the signal value and directs the signal to the appropriate cluster. If the signal is directed to the cluster 40 that the NRCA means 46 is currently located, the NRCA means 46 will direct the signal to the global register crossbar 51 in that NRCA means 46. If the signal is directed to another cluster 40, the NRCA means 46 will send the signal to that cluster over the inter-cluster communication paths 58 via the MRCA means 48. The global register crossbar 51 will direct any signal to the signal dispatch logic 460. FIG. 8 relates to FIG. 7 by showing the signal codes as transmitted on the indicated paths (e.g., AA, BB, etc.) in the signal mechanism shown in FIG. 7.

Once the signal value has reached the signal dispatch logic 460 in the NRCA means 46, it is dispatched from there using the signal fanout logic 470. A 13-bit code, shown as AA in FIG. 8, is sent from the dispatch logic 460 to the fanout logic 470. The code is the same as the signal select value, but does not have the cluster select bits attached. They are no longer necessary at this point since the value has already been directed to the proper cluster 40.

The signal fanout logic 470 decodes the substrate select field and sends a 9-bit signal code, shown as BB in FIG. 8, to the arbitration node 44 of the processor 10 or external interface port 22 being signaled. Separate signal buses connect the fanout logic 470 with each arbitration node 44.

Additional signal decode logic 480 within the arbitration node 44 further decodes the 9-bit signal code. A three-bit code, shown as DD in FIG. 8 is presented to each of the processors 10 attached to each arbitration node 44. A seven-bit code, shown as CC in FIG. 8 is presented to each external interface ports 22 attached to the arbitration node 44 for further transmission to the IOC 24.

The processors 10 further decode the signal value into the four types of signal and sets the appropriate bit in the PI register. If the corresponding interrupt disable bits are cleared in the SM register, processor instruction will be interrupted when the interrupt bit is set in the PI register.

The IOC 24 further decodes the 7-bit signal code sent from the arbitration node 44 into individual signals that are sent to the channels and the SMTCs, as described in the previously identified co-pending application entitled DISTRIBUTED INPUT/OUTPUT ARCHITECTURE FOR A MULTIPROCESSOR SYSTEM.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A dedicated centralized signaling mechanism for selectively sending and receiving signals to and from any one or all of a plurality of computer processors in a multiprocessor system, the signaling mechanism comprising:

a plurality of first switch multiplexing means, each first switch multiplexing means having two or more inputs and one output, the inputs being uniquely connected to two or more of the processors in the multiprocessor system, for receiving simultaneous signal commands generated by the two or more processors at the inputs and sending one or more of the signal commands to the output, each first switch multiplexing means comprising;

an arbitration node means, each arbitration node means having two or more inputs and one output, the inputs being uniquely associated with two or more devices for uniquely interconnecting the processors in that arbitration node means to other devices in the multiprocessor system; and queue means operably connected before the output of the arbitration node means for storing multiple signal commands for that arbitration node means;

a central multiplex means operably connected to all of the outputs of all of the first switch multiplexing means for simultaneously receiving all of the signal commands and selectively presenting the signal commands generated by the processors one signal command at a time, each signal command having a destination select value representing another device in the multiprocessor system to receive the signal command, the selected device, selectably determined by the processor sending the signal command;

signal dispatch logic means operably connected to the central multiplex means for receiving the signal commands from the central multiplex means, decoding the destination select value and generating an external interrupt signal to be sent to the selected device; and second switch means operably connected to the signal dispatch logic means and to each of the devices for receiving the external interrupt signals generated by the signal dispatch logic and routing the external interrupt signals to the selected device.

2. The signalling mechanism of claim 1 wherein the multiprocessor system includes two or more peripheral controllers and wherein one or more of the first switching multiplexing means and second switch means are uniquely connected to the two or more peripheral controllers and the peripheral controllers can be designated as a selected device and can also send simultaneous signal commands to be processed by the signal dispatch logic.

3. The signaling mechanism of claim 1 further comprising arbitration means operably connected to the first switch means for resolving simultaneous conflicting signal commands issued by two or more sending devices.

4. The signaling mechanism of claim 1 wherein the external interrupt signal generated by the signal dispatch logic means further comprises a plurality of bits representing one or more types of predefined signals to be acted upon by the selected device.

5. The signaling mechanism of claim 4 wherein the external interrupt signal generated by the signal dispatch logic means comprises a plurality of bits representing a format containing one or more types of predefined signals to be acted upon by the selected device, and the format differs depending upon whether the device is a peripheral controller or a processor.

6. The signaling mechanism of claim 1 further comprising arbitration means operably connected to each of the queue means for resolving simultaneous conflicting signal commands issued by two or more sending processors.

7. The signaling mechanism of claim 6 wherein the arbitration means is comprised of a multiple request toggling system that arbitrates the signal commands on a first-come, first-served basis with the priority of multiple simultaneous signal commands being resolved on the basis of a toggling decision between any unique pair of signal commands.

8. The signaling mechanism of claim 1 wherein the second switch means comprises:

a plurality of arbitration node means, each arbitration node means associated with two or more devices for uniquely interconnecting the devices in that arbitration node means to other devices in the multiprocessor system;

signal fanout logic means for routing the external interrupt signal to the artibration node means associated with the selected device; and signal decode logic means associated with each arbitration node means for routing the external interrupt signal to the selected device of the devices associated with that arbitration node means.

9. A dedicated centralized signaling mechanism for selectively sending and receiving signals among any or all of a plurality of computer processors in a multiprocessor system, the signaling mechanism comprising:

switch means operably connected to each of the processors in the multiprocessor system by a parallel data path for processing signal commands generated by the processors in the multiprocessor system, the signal command comprising a word of data sent along the parallel data path having a destination select value representing another device in the multiprocessor system to receive the signal command, the selected device, selectably determined by the processor sending the signal command, the switch means including:

a plurality of first means for receiving simultaneous signal commands generated by two or more of the processors, each first means for receiving simultaneous signal commands comprising;

an arbitration node means, each arbitration node means having two or more parallel data path inputs and one parallel data path output, the inputs being uniquely associated with two or more devices for uniquely interconnecting the processors in that arbitration node means to other devices in the multiprocessor system; and queue means operably connected before the output of the arbitration node means for storing multiple signal commands for that arbitration node means;

second means connected to each of the first means for resolving simultaneous conflicting signal commands issued by two or more sending processors and outputting one signal command; and third means connected to all of the second means for selectively presenting the signal commands generated by the processors one signal at a time; and signal dispatch logic means operably connected to the third means of the switch means for centrally receiving the signal commands from the switch means one signal at a time, decoding the destination select value and generating an external interrupt signal to be sent to the selected device.

10. The signaling mechanism of claim 9 wherein the second means for resolving simultaneous conflicting signal commands is comprised of a multiple request toggling system that arbitrates the signal commands on a first-come, first-served basis with the priority of multiple simultaneous signal commands being resolved on the basis of a toggling decision between any unique pair of signal commands.

* * * * *